United States Patent [19]
Mita et al.

[11] 3,974,899
[45] Aug. 17, 1976

[54] STEERING BRAKE SYSTEM FOR USE IN TRACK-TYPE VEHICLES

[75] Inventors: Masazo Mita, Hirakata; Masatsugu Nagatomo, Katano, both of Japan

[73] Assignee: Kabushiki Kaisha Komatsu Seisakusho, Tokyo, Japan

[22] Filed: May 7, 1975

[21] Appl. No.: 575,227

[52] U.S. Cl. .............................. 192/3 M; 180/82 R; 188/170; 303/2; 303/9; 303/13; 303/50; 303/71
[51] Int. Cl.² .......................................... B60K 41/20
[58] Field of Search ................ 303/2, 9, 13, 50, 68, 303/69, 71; 188/2 R, 170, 359; 192/3 R, 3 TR, 3 G, 3 M; 180/82 R, 77 R; 91/1, 170, 178; 92/63, 64, 65

[56] References Cited
UNITED STATES PATENTS

| | | | |
|---|---|---|---|
| 3,031,051 | 4/1962 | Huff | 192/3 R |
| 3,516,525 | 6/1970 | Skaggs | 188/170 X |
| 3,837,449 | 9/1974 | Drone | 188/170 X |
| 3,838,624 | 10/1974 | Mita et al. | 188/170 X |

*Primary Examiner*—Trygve M. Blix
*Assistant Examiner*—Douglas C. Butler
*Attorney, Agent, or Firm*—Armstrong, Nikaido & Wegner

[57] ABSTRACT

Braking system for use in track-type vehicles. The system includes a steering brake, a brake cylinder in which an emergency brake piston and a spring for biassing the emergency brake piston to its braking position are provided. The emergency brake piston is operatively connected to the steering brake through a link mechanism and defines with the braking cylinder a hydraulic pressure receiving chamber connected to a hydraulic fluid supply source to maintain the emergency brake piston in its non-braking position against a biassing action of the spring in case of the normal condition of the vehicle. The link mechanism comes into contact with an auxiliary lever serving to move the emergency brake piston to its non-braking position.

3 Claims, 5 Drawing Figures

STEERING BRAKE SYSTEM FOR USE IN TRACK-TYPE VEHICLES

BACKGROUND OF THE INVENTION

1. Field of the Invention

This invention relates to a braking system, and more particularly to a steering brake system for use in track-type vehicles.

2. Description of the Prior Art

In a track-type vehicle having a steering clutch system, a steering brake system such that it is operated by means of an operating member, such as, for example, a brake pedal, by which the steering clutch is also operated in a predetermined time lag has been heretofore well known. The steering brake system of this type is properly used for applying to the vehicle a normal brake and an emergency one by the action of a variable pressure reducing valve operated by the depression of the brake pedal so as to increase the safety of the vehicle. The proper use of the steering brake system is dependent upon a degree of the depression of the brake pedal. In such steering brake system, the emergency brake is performed by urging an emergency brake piston slidably inserted within a brake cylinder to its braking position by the action of a spring provided within the brake cylinder. In order to release the emergency brake in the above-mentioned conventional system, it is therefore essential to apply a hydraulic pressure to a pressure receiving chamber defined by and between the brake cylinder and the emergency brake piston to move the piston in its nonbraking position against the action of the spring. For this reason, the foregoing prior art steering brake system is disadvantageous in that, if the engine of the vehicle is stopped or is in a low idling under such a condition that the emergency brake is applied thereon, the emergency brake cannot be released, accordingly it is difficult to move the vehicle.

SUMMARY OF THE INVENTION

The present invention contemplates to eliminate the foregoing disadvantages of the conventional steering brake system.

It is therefore a primary object of the present invention to provide a steering brake system for use in a track-type vehicle wherein an emergency brake can be applied by the action of a spring at a moment when the vehicle is confronted with an emergency and the emergency brake can be easily released even when the engine of the vehicle is stopped or is in a low idling.

According to the first aspect achieving the above object of the present invention, there is provided a steering brake system for use in a track-type vehicle which comprises a steering brake, a brake cylinder, an emergency brake piston slidably inserted into the brake cylinder and operatively connected to the steering brake through a first link mechanism including a brake lever, a spring means provided within the brake cylinder to bias the emergency brake piston toward its braking position, a hydraulic pressure receiving chamber defined by and between the brake cylinder and the emergency brake piston and connected to a hydraulic fluid supply circuit to maintain the emergency brake piston in its non-braking position against the action of the spring means in case of the normal condition of the vehicle, a drain connected to the hydraulic fluid supply circuit through a first drain circuit in which a variable pressure reducing valve for controlling hydraulic pressure within the hydraulic pressure receiving chamber in the brake cylinder and the hydraulic fluid supply circuit in response to a degree of depression of a brake pedal connected thereto through a second link mechanism is provided, said valve having drain ports each connected to the first drain circuit to drain away therefrom hydraulic fluid in case of emergency of the vehicle, and an auxiliary lever of which one end thereof comes into contact with the brake lever and the other end is connected to the brake pedal through an auxiliary link mechanism substituted for the second one at a moment when the emergency brake is operated, wherein the emergency brake can be released by urging the emergency brake piston toward it non-braking position against the action of the spring means by the depression of the brake pedal without using any hydraulic pressure.

According to the second aspect of the present invention, there is provided a steering system as set forth in the first aspect, which further comprises an auxiliary drain circuit of which one end thereof is connected to the drain and the other end is connected to the hydraulic fluid supply circuit through a check valve, the auxiliary drain circuit being provided therein with an axuiliary selector valve manually operated to open or close the auxiliary drain circuit, whereby hydraulic fluid may be drained away through the auxiliary drain circuit and the auxiliary selector valve to operate the emergency brake at a moment when the vehicle is confronted with an emergency and even when any trouble happens in the first drain circuit.

According to the third aspect of the present invention, there is provided a steering brake system as set forth in the second aspect, which further comprises a cylinder-piston assembly within which a hydraulic pressure receiving chamber defined by and between the cylinder and the piston is formed and a spring for biassing the piston is provided, a conduit having a check valve, the conduit being connected between the hydraulic fluid supply circuit and the hydraulic pressure receiving chamber of the cylinder-piston assembly, a drain line connected between a drain port of the auxiliary selector valve and the conduit downstream the check valve provided in the conduit, and a deceleration lever for decelerating the engine speed connected through a piston rod to the piston of the cylinder-piston assembly, whereby the engine of the vehicle is made in a low-idling simultaneously when the emergency brake is operated.

BRIEF DESCRIPTION OF THE DRAWINGS

The above and other objects, features and advantages of the present invention will become apparent from the following description taken in conjunction with the accompanying drawings in which.

DETAILED DESCRIPTION OF THE PREFERRED EMBODIMENT

Figure 1:
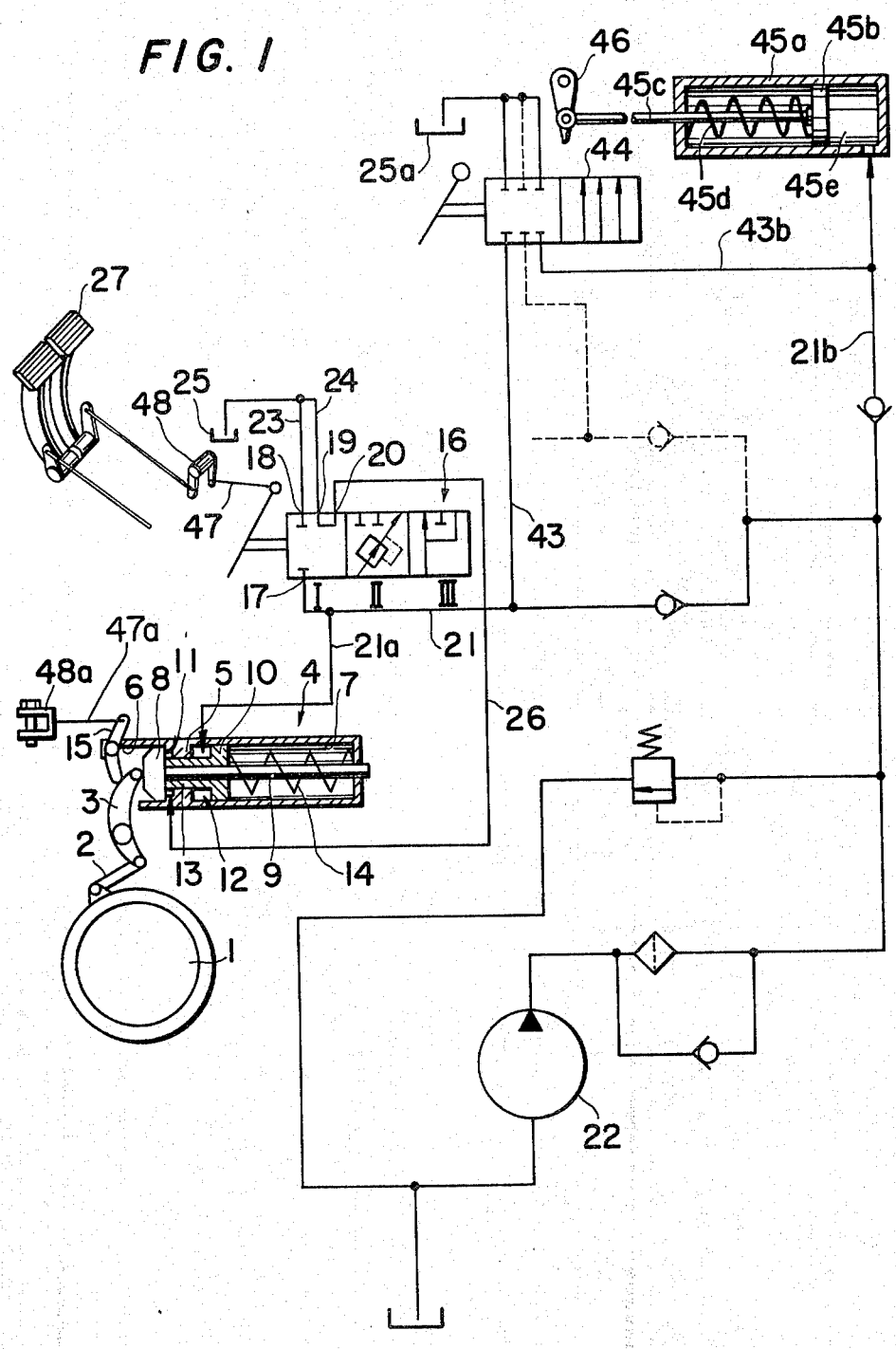
FIG. 1 is an explanatory view of a steering brake system of the present invention.

Reference is now made to the drawings, which show one embodiment of a steering brake system for use in track-type vehicles. Reference numeral 1 represents a steering brake of a disk type having its operating arm 2 pivotally connected to an oscillating brake lever 3 which is actuated by the action of a brake cylinder 4. The brake cylinder 4 is divided by a partition wall 5 into a first cylinder chamber 6 and a second cylinder chamber 7. A normal brake piston 8 is disposed within the first cylinder chamber 6 to define a first hydraulic pressure receiving chamber 11 with the partition wall 5. The normal brake piston 8 is moved to its braking position when hydraulic fluid is fed into the first hydraulic pressure receiving chamber 11. The piston 8 has a piston rod 9 connected thereto and the piston rod 9 extends through the partition wall 5 into the second cylinder chamber 7. On the piston rod 9 is slidingly mounted an emergency brake piston 10 which is slidingly inserted within the second cylinder chamber 7 to define a second hydraulic pressure receiving chamber 12 with the partition wall 5. The emergency brake piston 10 has a piston rod 13 which extends through the partition wall 5 into the first hydraulic pressure receiving chamber 11. The emergency brake piston 10 is biassed in a direction of the normal brake piston 8 by the repulsion force of a spring 14, so that the normal brake piston 8 is urged toward its braking position. When hydraulic fluid is supplied into the second hydraulic pressure receiving chamber 12, however, the emergency brake piston is moved against the action of the spring 14 toward its non-braking position. Pivotally mounted on the end of the brake cylinder 4 is an auxiliary lever 15 which abuts through one end thereof against the rear face of the brake lever 3. The arrangement of the auxiliary lever 15 is made such that when the auxiliary lever 15 is actuated the brake lever 3 is oscillated to move the normal brake piston 8 and the emergency brake piston 10 to their respective non-braking positions. The other end of the auxiliary lever 15 is provided an auxiliary link mechanism 47a. Reference numeral 16 denotes a variable pressure reducing valve having formed therein an inlet port 17, first and second drain ports 18 and 19, and an outlet port 20. The inlet port 17 is connected by way of a hydraulic fluid supply conduit 21 to a hydraulic fluid supply source 22, and the first and second drain ports 18 and 19 are connected through drain conduits 23 and 24, respectively, to a drain 25. The outlet port 20 is connected by way of a conduit 26 to the first hydraulic pressure receiving chamber 11 formed within the brake cylinder 4. The conduit 21 is connected through a conduit 21a to the second hydraulic pressure receiving chamber 12 of the brake cylinder 4. Reference numeral 27 indicates a foot brake pedal which is operatively connected through a link mechanism 47 to the variable pressure reducing valve 16. When the brake pedal 27 is depressed, the reducing valve 16 is rendered operative to occupy a pressure reducing position II, and further when the brake pedal 27 is fully depressed, the variable pressure reducing valve 16 occupies an emergency brake operating position III. When the brake pedal 27 is released to a free state, the variable pressure reducing valve 16 occupies its neutral position I. The conduit 21 is connected to an auxiliary drain pipe 43 which is provided therein with an auxiliary selector valve 44 for operating the emergency brake. The selector valve 44 serves to open and close the drain pipe 43.

Figure 2:
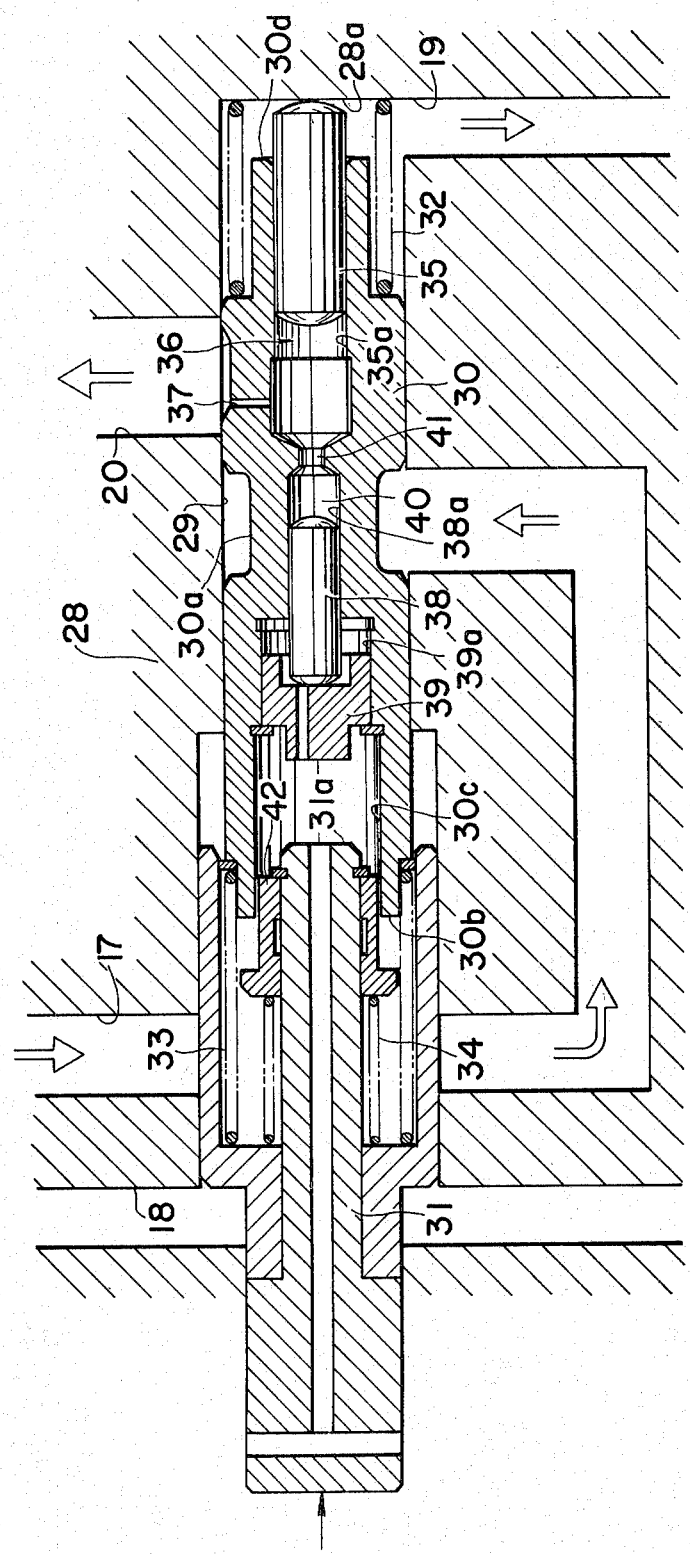
FIG. 2 is a sectional view of a variable pressure reducing valve used in the system.

As shown in detail in FIG. 2, the variable pressure reducing valve 16 comprises a valve body 28 having formed therein a hole 29 within which are slidably inserted a spool 30 which controls the communication between the inlet port 17 and the outlet port 20, and a plunger 31 operatively connected to the brake pedal 27. Between the spool 30 and the plunger 31 first and second compression coil springs 33 and 34 are coaxially interposed. A third compression coil spring 32 is interposed between the distal end of the spool 30 and the inner end face 28a of the valve body 28. A load piston 35 is slidably inserted into the distal end portion of the spool 30. One end of the load piston 35 abuts against the inner end face 28a of the valve body 28, and the other end thereof faces a hydraulic pressure receiving chamber 36 formed within the spool 30 and communicating with a load piston hole 35a. The hydraulic pressure receiving chamber 36 further communicates with the outlet port 20 through an aperture 37. On the side of the primary end of the spool 30, a first larger hole 30c in which a collar 42 mounted on the plunger 31 at the distal end portion thereof is slidably inserted, a second intermediate hole 39a in which an abutting member 39 abutting against the end face 31a of the plunger 31 when the plunger 31 is moved by the depression of the brake pedal 27 to the right at a predetermined stroke is slidably inserted, and a third smaller hole 38a in which a slide rod 38 is slidably and oil-tightly inserted are formed, respectively, in order from the primary end thereof. Within the third smaller hole 38a is defined by and between the slide rod 38 and the spool body a hydraulic pressure receiving chamber 40 which communicates with the pressure receiving chamber 36 through a small aperture 41. As the plunger 31 is moved by the depression of the brake pedal 27 to the right over the predetermined stroke thereof, the inlet port 17 is permitted to communicate through the drain port 18 with the drain. Further, a reduced portion 30a is formed at the intermediate outer peripheral surface of the spool 30 so as to allow the communication between the inlet port 17 and the outlet port 20 when the spool 30 is moved to the right at a predetermined stroke thereof in accordance with the movement of the plunger 31.

Both the plunger 31 and the abutting member 39 have an air escaping hole.

In cooperation with the brake pedal 27, operation of the variable pressure reducing valve 16 is described in detail hereinafter.

Since the plunger 31 is moved to the right by depression of the brake pedal 27, the spool 30 is moved to the right by the action of the first spring 33 against the action of the third spring 32 so that the inlet port 17 is permitted to communicate through the reduced portion 30a with the outlet port 20 to increase hydraulic pressure within the outlet port 20, with the result that, hydraulic pressure within the first hydraulic pressure receiving chamber 11 of the brake cylinder 4 is increased also. As a result, hydraulic pressure within the pressure receiving chamber 36 communicating through the aperture 37 with the outlet port 20 is also increased to urge the spool to the left through the load piston 35 so that the communication between the inlet port 17 and the outlet port 20 is shut off. Consequently, hydraulic pressure within the outlet port 20 is commensurate with the amount of movement of the plunger 31 which depends on the amount of depression of the pedal 27.

When the pedal 27 is further depressed, the collar 42 mounted on the plunger 31 and biased to the right by the second spring 34 is brought into contact with the end face 30b of the spool 30 so that the spool 30 is moved to the right by the action of the first and second springs 33 and 34 against the action of the third spring 32. As a result, the inlet port 17 is permitted to communicate through the reduced portion 30a with the outlet port 20, so that hydraulic pressure within the outlet port 20 is further increased, consequently hydraulic pressure within the first hydraulic pressure receiving chamber 11 of the brake cylinder 4 is further increased also. Therefore, the normal brake piston 8 is moved to its braking position so as to operate the operating arm 2 through the oscillating brake lever 3 to actuate the steering brake 1.

When the brake pedal 27 is still further depressed, the plunger 31 is brought into abutment against the abutting member 39 which is brought in turn into contact with one end of the slide rod 38. Whereupon, the plunger 31 tends to urge the slide rod 38 through the abutting member 39, however, the slide rod 38 can be hardly moved to the right due to the resistance of hydraulic pressure within the pressure receiving chamber 36 on the side of the load piston 35. Therefore, only the spool 30 is moved to the right and the other end face 30d of the spool 30 abuts against the inner end face 28a of the valve body 28. Then, at that time, if the brake pedal 27 will be further depressed, a greater depression force becomes necessary for the further depression of the brake pedal 27, because hydraulic pressure within the pressure receiving chamber 36 of the spool 30 is exerted on the slide rod 38 so that the resistance to the rightward sliding movement of the plunger 31 is remarkably increased. As a result, the operator of the vehicle in which the steering brake system is equipped can sense that the other end face 30d of the spool 30 has abutted against the inner end face 28a of the valve body 28. Thereafter, when the brake pedal 27 is further depressed against the resistance due to the hydraulic pressure within the pressure receiving chamber 36, the spool 30 is moved further to the right through the plunger 31 so as to allow the communication between the first drain port 18, the inlet port 17 and the outlet port 20 in short-circuit. At that time, the hydraulic pressure within the outlet port 20 and the inlet port 17 drops suddenly, consequently hydraulic pressure within the first and second hydraulic pressure receiving chambers 11 and 12 of the brake cylinder 4 is suddenly reduced, so that the the emergency brake piston 10 is moved rapidly to its braking position by the action of the spring 14 to oscillate the oscillating brake lever 3 through the normal brake piston 8, thereby operating the operating arm 2 to effect the application of the steering brake 1. And then, when the brake pedal 27 is still further depressed, the slide rod 38 is slided within the hole 38a to the right. Thus, the plunger 31 is reached to the stroke end position thereof.

Figure 3:
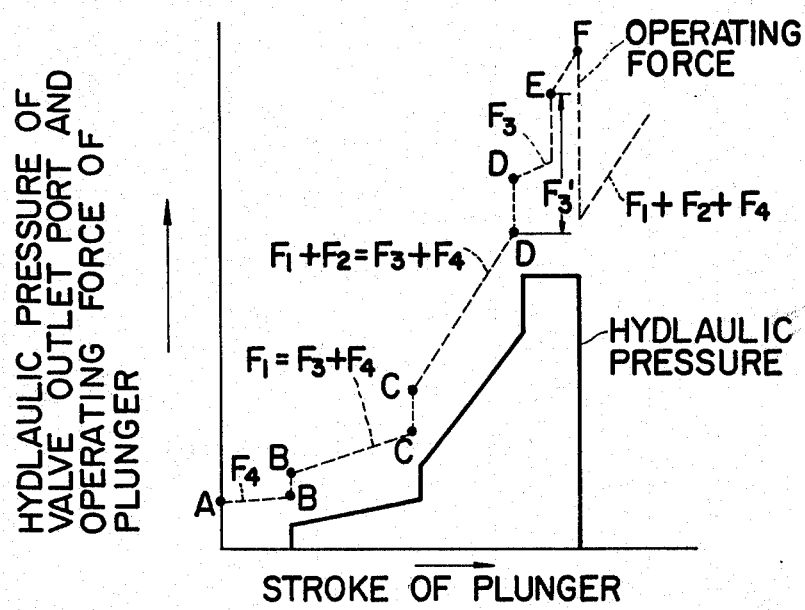
FIG. 3 is a diagram showing the relationship between the stroke of a plunger of the variable pressure reducing valve and the operating force thereof and the relationship between the stroke of the plunger and hydraulic pressure of the outlet port of the valve.
Figure 4:
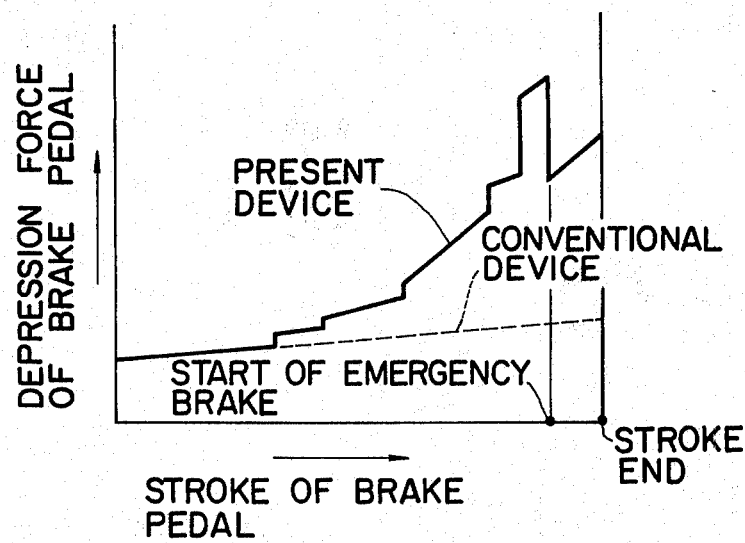
FIG. 4 is a diagram showing the relationship between the stroke of a brake pedal and the depression force applied thereonto.
Figure 5:
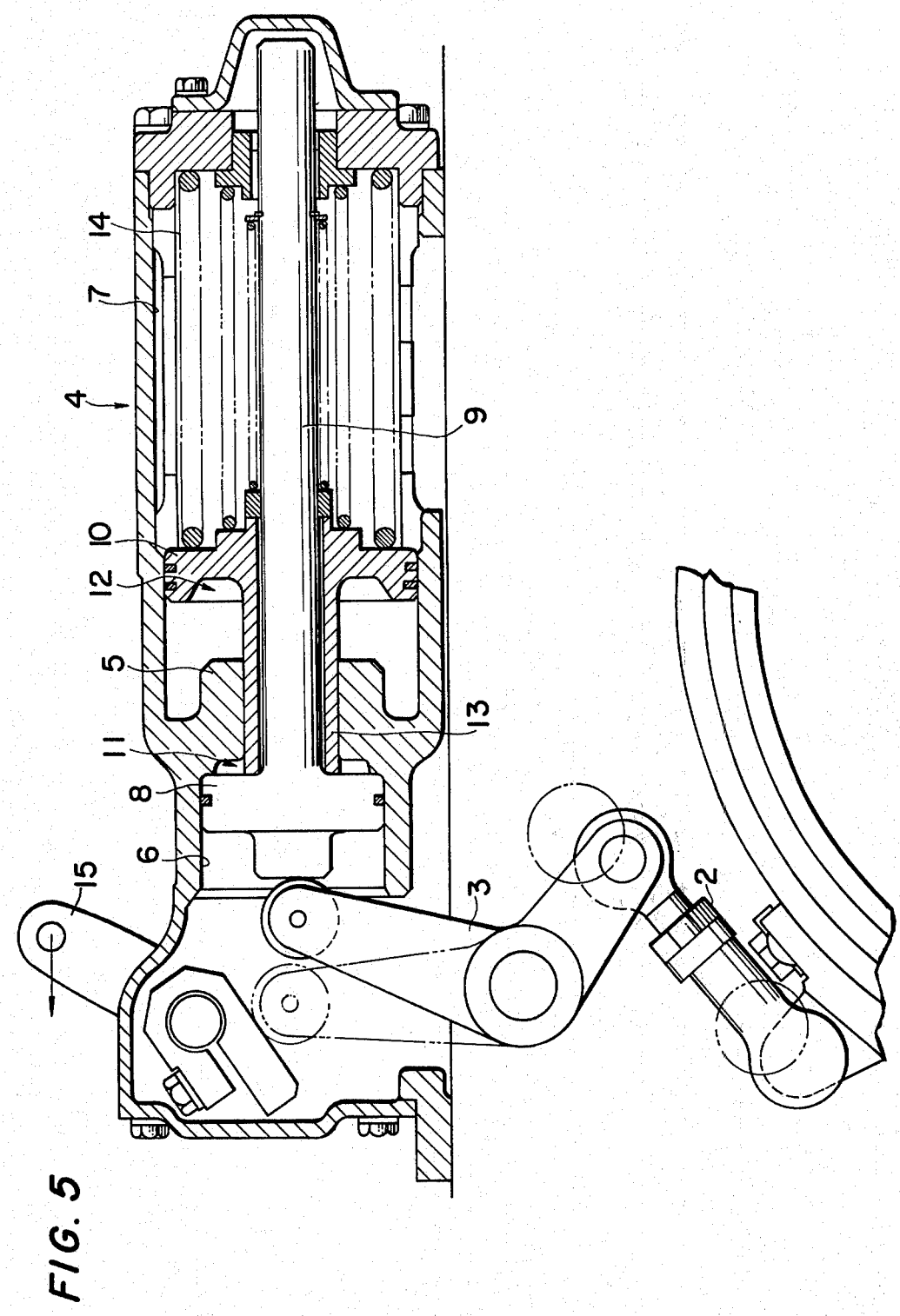
FIG. 5 is an enlarged sectional view of a brake cylinder.

FIG. 3 is a diagram showing the relationship between the stroke of the plunger 31 and the operating force thereof and the relationship between the stroke and hydraulic pressure of the outlet port 20, and FIG. 4 is a diagram showing the relationship between the stroke of the brake pedal 27 and the depression force applied thereto.

In FIGS. 3 and 4, the operating force necessary for operating the plunger 31 of the variable pressure reducing valve 16 and that necessary for operating the brake pedal 27 vary as shown in FIGS. 3 and 4. The operating force for the brake pedal is suddenly increased just before the emergency brake piston 10 of the brake cylinder 4 is urged to its braking position.

In FIG. 3, reference character $F_1$ denotes a resilient force of the first spring 33, $F_2$ a resilient force of the second spring 34, $F_3$ a reaction force due to hydraulic pressure within the pressure receiving chambers 36 and 40, and $F_4$ represents a resilient force of the third spring 32.

In order to positively apply the emergency brake to the vehicle, the steering brake system of the present invention is further provided with an auxiliary selector valve 44 and a cylinder-piston assembly 45.

The auxiliary selector valve 44 is manually operated in case of emergency and is provided in an auxiliary drain conduit 43 of which one end thereof is connected through a check valve to the hydraulic fluid supply conduit 21 and the other end thereof is connected to a drain 25a. When the auxiliary selector valve 44 is manually operated, hydraulic fluid within the second hydraulic pressure receiving chamber 12 can be immediately drained away through the auxiliary selector valve 44 via the auxiliary drain conduit 43 to the drain 25a. Therefore, the emergency brake is positively operated at a moment when the vehicle is confronted with an emergency even if any trouble happens in the drain conduits 23 and 24.

The cylinder-piston assembly 45 comprises a cylinder body 45a, a piston 45b slidably inserted within the cylinder body 45a and having a piston rod 45c fixedly secured through one end thereof to the piston 45b, and a coil spring 45d provided within the cylinder body 45a to bias the piston 45b. The other end of the piston rod 45c is connected to a deceleration lever 46 which decelerates output of the engine when the lever 46 is actuated.

Within the cylinder-piston assembly 45, a hydraulic pressure receiving chamber 45e is defined by and between the cylinder body 45a and the piston 45b. The chamber 45e is connected through a conduit 21b having a check valve to the hydraulic fluid supply conduit 21 so as to hold the piston 45b against the biassing force of the spring 45d at a predetermined position within the cylinder body 45a where the deceleration lever 46 is not operated. In addition, the conduit 21b is provided with a drain line 43b of which one end thereof is connected to one of drain ports of the auxiliary selector valve 44 and the other end is connected to the conduit 21b downstream the check valve provided in the conduit 21b.

Therefore, when the auxiliary selector valve 44 is manually operated, hydraulic fluid within the chamber 45e can be drained away through the selector valve 44 via the drain line 43b to the drain 25a so that the piston 45b is slidably moved to the right by the action of the spring 45d to actuate the deceleration lever 46. Thus, when the vehicle is confronted with an emergency, not only the emergency brake is positively applied, but also output of the engine is decelerated so as to increase the safety for the vehicle.

Further, the steering brake system of the present invention has the following advantageous function.

Namely, in case that it is necessary to slightly move the vehicle on which the emergency brake is applied, an auxiliary link mechanism 47a of which one end thereof is connected to the auxiliary lever 15 and the other end is provided with a yoke end 48b can be newly connected to the intermediate brake lever 48a in place of the link mechanism 47 by the manual operation so that the emergency brake can be mechanically released by the depression of the brake pedal 27 without operating the hydraulic mechanism.

What is claimed is:

1. A steering brake system for use in a track-type vehicle which comprises a steering brake, a brake cylinder, an emergency brake piston slidably inserted into the brake cylinder and operatively connected to the steering brake through a first link mechanism including a brake lever, a spring means provided within the brake cylinder to bias the emergency brake piston toward its braking position, a hydraulic pressure receiving chamber defined by and between the brake cylinder and the emergency brake piston and connected to a hydraulic fluid supply circuit to maintain the emergency brake piston in its non-braking position against the action of the spring means in case of the normal condition of the vehicle, a brake pedal, a drain connected to the hydraulic fluid supply circuit through a first drain circuit including a variable pressure reducing valve for controlling hydraulic pressure within the hydraulic pressure receiving chamber in the brake cylinder and the hydraulic fluid supply circuit in response to a degree of depression of a brake pedal, said brake pedal being connected to said variable pressure reducing valve through a second link mechanism, said valve having drain ports each connected to the first drain circuit to drain away therefrom hydraulic fluid in case of emergency of the vehicle, and an auxiliary lever having one end adapted to contact the brake lever when the emergency brake is operated and the other end connected to the brake pedal through an auxiliary link mechanism, wherein the emergency brake can be released by urging the emergency brake piston toward its non-braking position against the action of the spring means by the depression of the brake pedal without using any hydraulic pressure.

2. A steering brake system as set forth in claim 1, further comprising an auxiliary drain circuit of which one end thereof is connected to the drain and the other end is connected to the hydraulic fluid supply circuit through a check valve, the auxiliary drain circuit being provided therein with an auxiliary selector valve manually operated to open or close the auxiliary drain circuit, whereby hydraulic fluid may be drained away through the auxiliary drain circuit and the auxiliary selector valve to operate the emergency brake at a moment when the vehicle is confronted with an emergency even when any trouble happens in the first drain circuit.

3. A steering brake system as set forth in claim 2, further comprising a cylinder-piston assembly within which a hydraulic pressure receiving chamber defined by and between the cylinder and the piston is formed and a spring for biassing the piston is provided, a conduit having a check valve, the conduit being connected between the hydraulic fluid supply circuit and the hydraulic pressure receiving chamber of the cylinder-piston assembly, a drain line connected between a drain port of the auxiliary selector valve and the conduit downstream the check valve provided in the conduit, and a deceleration lever for decelerating the engine speed connected through a piston rod to the piston of the cylinder-piston assembly, whereby the engine of the vehicle is made in a low-idling simultaneously when the emergency brake is operated.

* * * * *